Oct. 4, 1966        H. L. BIRUM, JR        3,276,175
MOVABLE PARTITION
Filed June 8, 1962                         5 Sheets-Sheet 1
FIG.1a
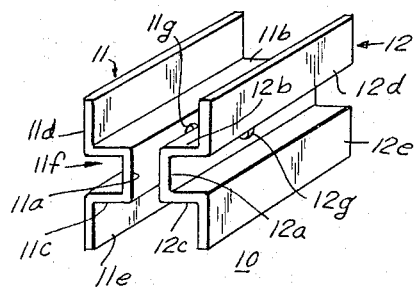
FIG.1b
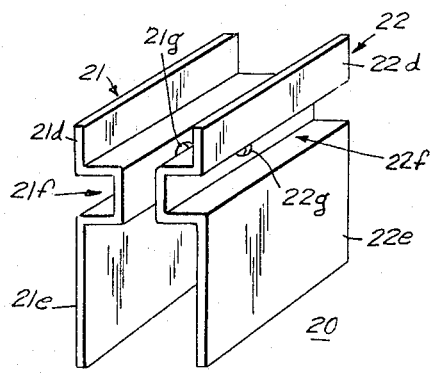
FIG.1d
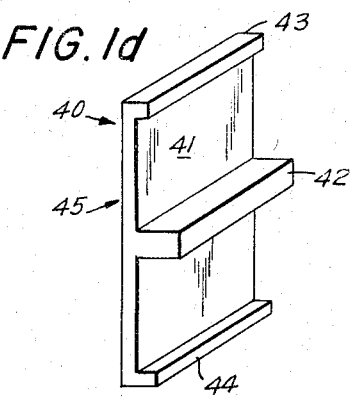
FIG.1c
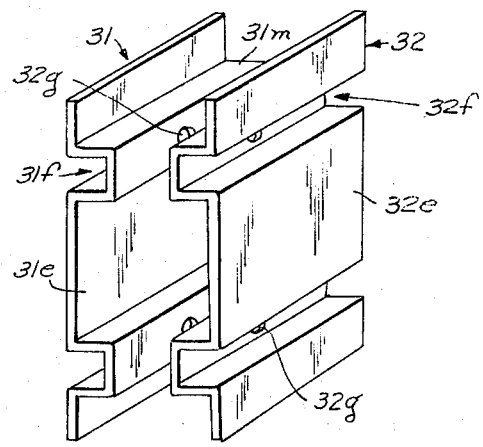
FIG.1e
FIG.1f
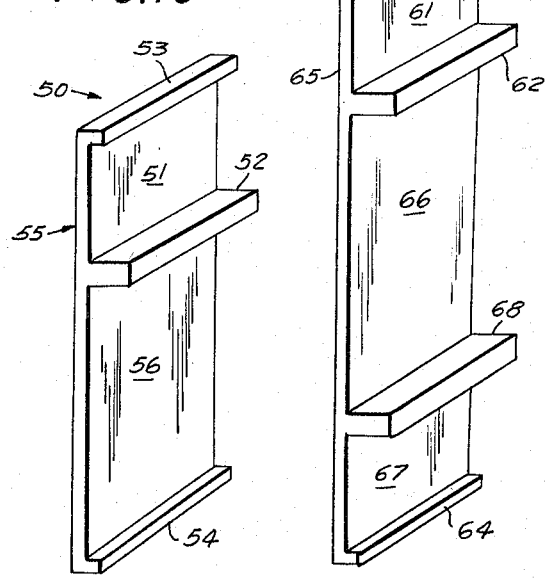
FIG.1g
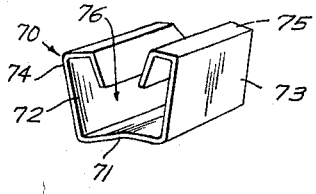
INVENTOR.
HERBERT L. BIRUM, Jr.
BY
OSTROLENK, FABER, GERB AND SOFFEN
ATTORNEYS Oct. 4, 1966 H. L. BIRUM, JR 3,276,175
MOVABLE PARTITION Filed June 8, 1962 5 Sheets-Sheet 2

INVENTOR.
HERBERT L. BIRUM, Jr.
BY
OSTROLENK, FABER, GERB AND SOFFEN
ATTORNEYS

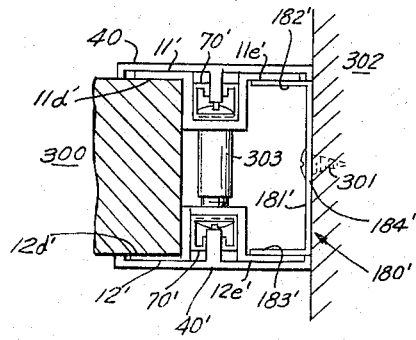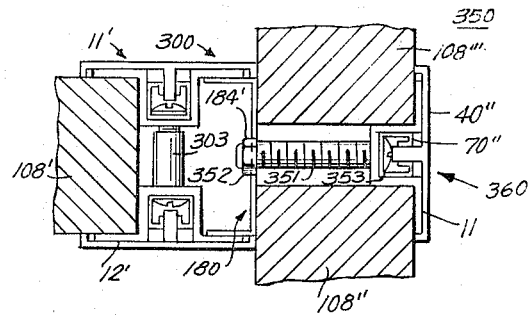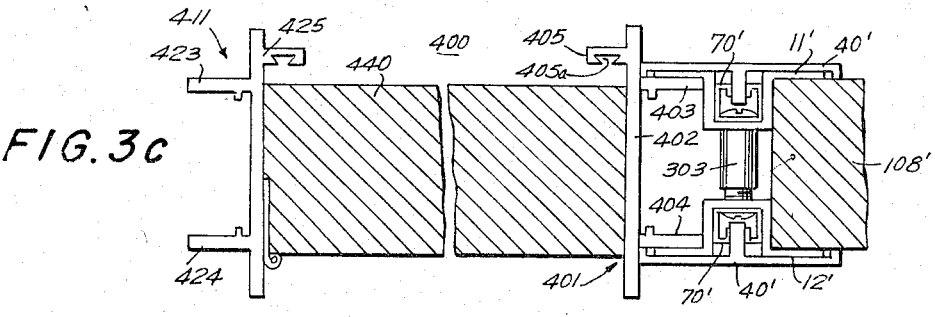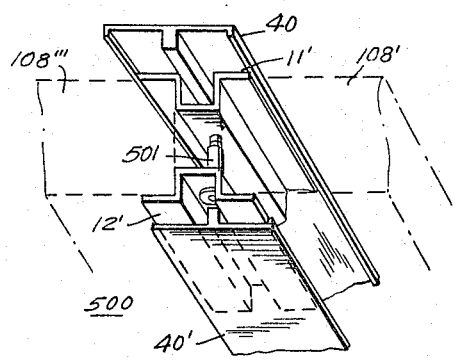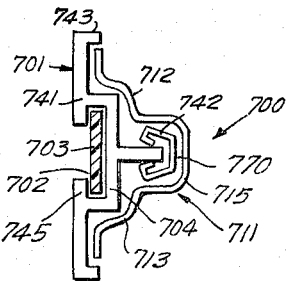

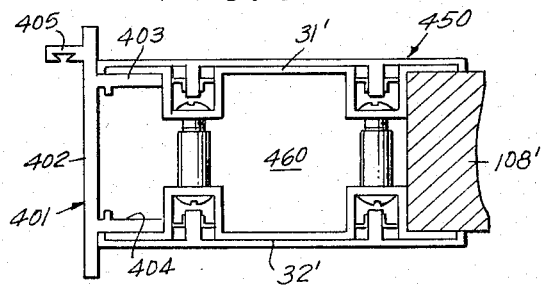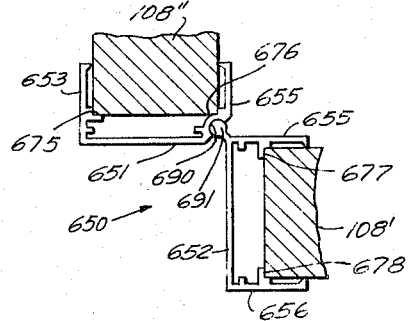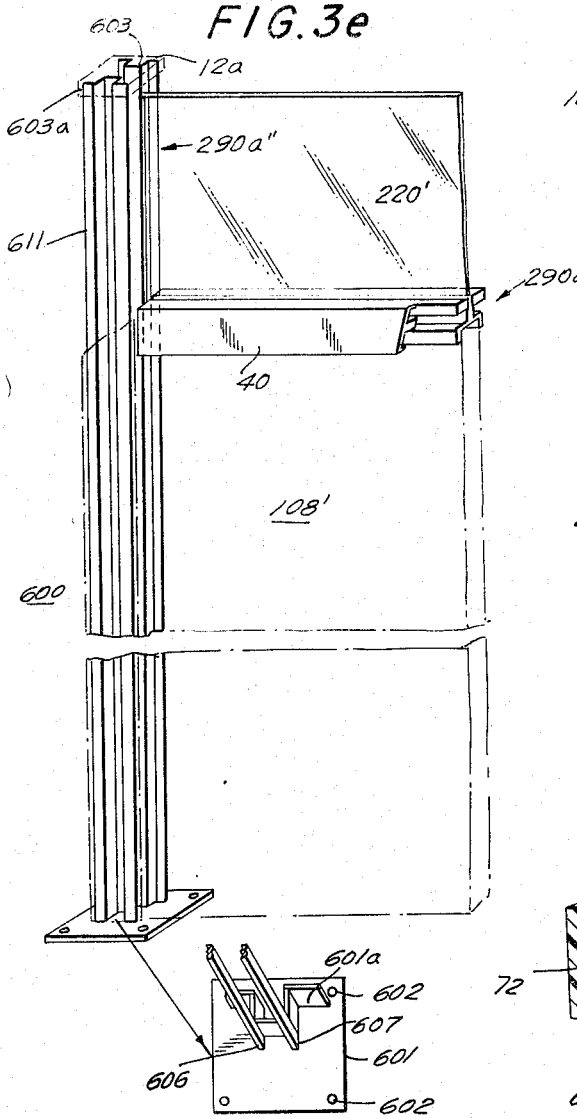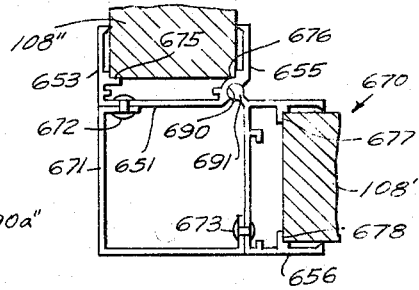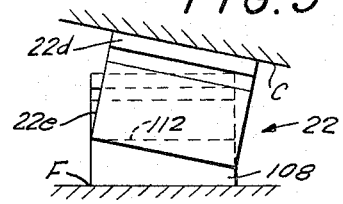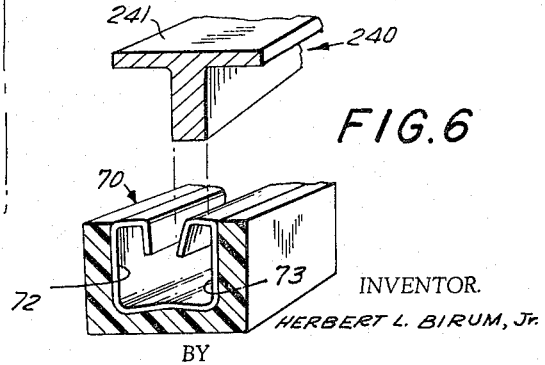

Oct. 4, 1966  H. L. BIRUM, JR  3,276,175
MOVABLE PARTITION
Filed June 8, 1962  5 Sheets-Sheet 5
FIG. 8
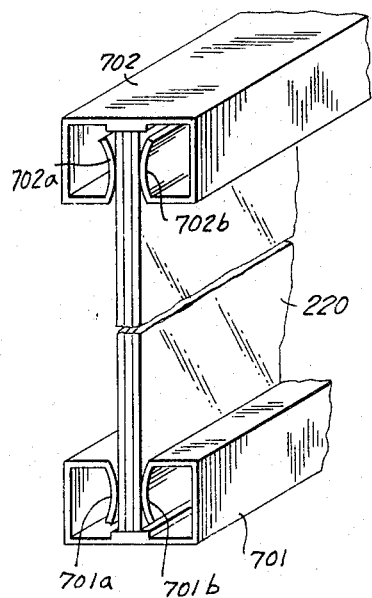
FIG. 9
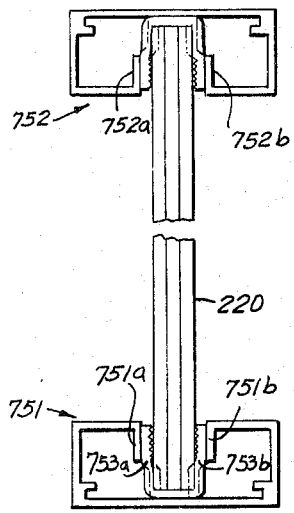
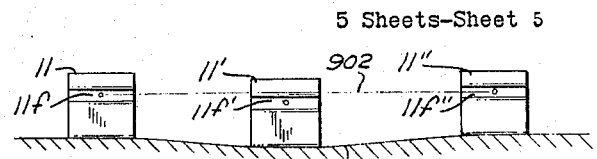
FIG. 10a
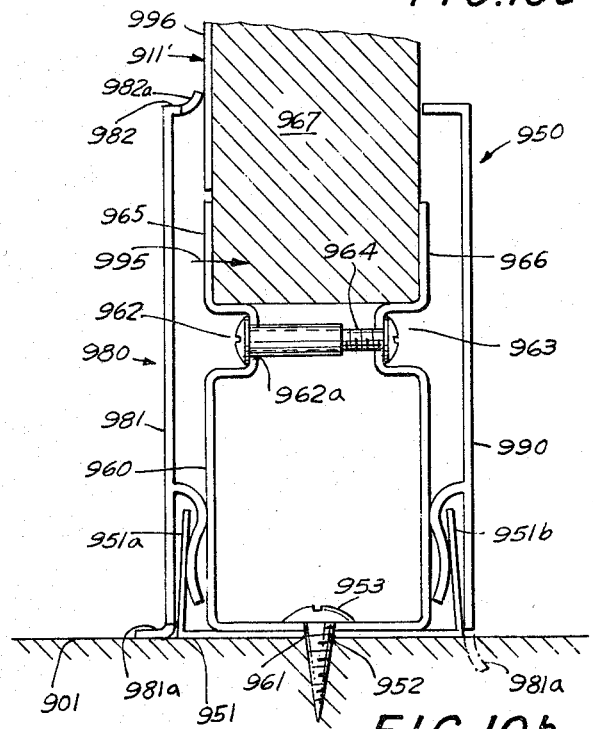
FIG. 10b
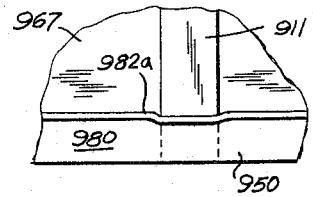
FIG. 10c
INVENTOR.
HERBERT L. BIRUM, JR.
BY
OSTROLENK, FABER, GERB AND SOFFEN
ATTORNEYS

United States Patent Office 3,276,175
Patented Oct. 4, 1966

3,276,175
MOVABLE PARTITION
Herbert L. Birum, Jr., Pleasant Valley, Titusville, N.J.
Filed June 8, 1962, Ser. No. 201,020
13 Claims. (Cl. 52—239)

This invention relates to the building industry and more particularly to movable partitions which may be employed in the interior of buildings, homes and the like, and which is so designed as to be easily installed and/or removed and to further have a relatively simple construction.

In the design of offices, rooms and the like, in either private homes or large scale office buildings, it is quite often difficult to foresee at the time of initial construction the axact area requirements which will ultimately be desired by the user. For this reason, it is advantageous to have walls, or partitions, which may be simply and readily installed and if need be, may be simply and readily removed as the area requirements of the user becomes substantially different from original requirements.

Since the normal room requirements necessitate the consideration of providing adequate electrical wiring together with each room it becomes necessary to provide the proper conduits which are installed so that they are out of sight so as not to mar the appearance of the room and in addition, so as to be safe from harmful outside influences and yet be readily available for the purpose of either maintenance or repair. It therefore becomes necessary in the redesign or repositioning of room partitions to relocate electrical conduits so that all characteristics recited above are retained after repositioning of partitions.

Another problem encountered in the installation of room partitions is that of the non-parallelism between floor and ceiling in building installations. By that, what is meant is that the floors and ceilings are not exactly in parallel, but may be mis-aligned by as much as two or three inches over the space of a number of feet. This occurs even in the construction of buildings having the highest degree of engineering skill devoted to the construction thereof.

The basic design of prior art movable partition assemblies is comprised of an elongated mounting assembly, which employs first and second continuous elongated members which are adapted so as to clamp adjacent partitions between the opposite edges of the first and second elongated members. Fastening means are provided at predetermined intervals thereof for the purpose of permanently securing the first and second elongated members to one another to provide for the necessary clamping. While this arrangement provides movable partitions having suitable strength, the cost in fabrication of the mounting assemblies become rather substantial.

The instant invention overcomes the disadvantages of prior art structures by employing a plurality of mounting assemblies spaced at predetermined intervals, which assemblies cooperate with elongated continuous cover plates, which when placed in their proper positions present the same overall appearance as do such prior art structures, while at the same time significantly decreasing the amount and hence the cost of the mounting assemblies. The instant invention is based upon the principle that the all-panel members, which the mounting assemblies are to position and support, themselves have certain inherent strength characteristics which are sufficient so as to alleviate the necessity for relying primarily upon the mounting assemblies for providing the necessary strength so as to support the wall, or vertical panel members.

The partition assembly of the instant invention is so designed as to be easily and readily installable, is adapted to completely compensate for any mis-alignment, or non-parallelism between floor and ceiling, further provides adequate concealed passage for electrical conduits and is readily adapted to permit maintenance or inspection of conduits contained therein at any time and in a very simple operation without interfering with the function of, or permanently injuring the movable partition assembly.

The movable partition of the instant invention is comprised of a mounting assembly which is readily adaptable for mounting to either floor, ceiling, wall or other adjacent partitions. The mounting assembly is comprised of a base channel and cooperating clips adapted to secure therebetween and at opposite ends thereof the base channel and a panel member. The base channel mentioned above is suitably secured to the floor or supporting surface in any well known manner. The cooperating clips of the mounting assembly are of a predetermined length, which length is substantially less than the length of the particular wall panel member which the mounting clips are employed to support. Thus, it should be noted that it is necessary to provide a plurality of such clips at predetermined spaced intervals along the margin of the wall panel member being supported for adequate positioning and support thereof. The face plate members are elongated continuous members which are so adapted as to fit in appropriate channels provided in the mounting assembly clips so that when properly positioned the overall appearance of the panel assembly conveys the impression of an elongated continuous mounting assembly, conveying a pleasing aesthetic appearance. It is most significant to note that the mounting assembly of the instant invention provides more than adequate strength for the partition being mounted since the mounting assembly takes advantage of the inherent strength and rigidity of the panel wall members themselves so that the total supporting strength of the entire structure is satisfactory for any imaginable application thereof. A mounting assembly of substantially the same design is secured to the ceiling of the room to be partitioned and is adapted to receive the opposite end of the panel held by the first recited mounting assembly and is so adapted as to compensate for any mis-alignment between floor and ceiling. When required, the mounting assembly is designed so as to provide adequate passage for electrical conduits employed for the purpose of conveying electricity to the area being partitioned for any needs desired by the user such as for lighting, energizing equipment etc. The cooperating clips are further designed to receive finished plates which are positioned to cover said clips so as to provide a partition wherein the outward appearance of the partition is aesthetically appealing. When it is required to either replace or remove the clip arrangements for any purpose whatsoever, the plates and clips are so designed as to facilitate the removal operation.

The design of the clips, plates and other fastening means provide the mounting assemblies with a high degree of flexibility as to their use, such that the mounting assemblies may be employed in a variety of different ways for a variety of different uses, as will become apparent when reading the description of the invention set forth herein.

It is therefore one object of this invention to provide a partition assembly which is so designed as to facilitate installation thereof.

Another object of this invention is to provide a partition assembly which is so designed as to facilitate the installation and/or removal thereof.

Still another object of this invention is to provide a partition assembly which is so designed as to compensate for the mis-alignment which occurs in the construction of buildings so as to prevent mis-alignment from being noticeable.

Another object of this invention is to provide a mounting assembly comprised of a mounting clip arrangement wherein each of said clips is of predetermined length and wherein a plurality of such mounting clips are employed at predetermined spaced intervals along the wall panel members to be positioned and supported providing adequate strength for support thereof.

Still another object of this invention is to provide a partition assembly employing a plurality of unique mounting clip arrangements at spaced predetermined intervals thereof and a continuous elongated cover plate member adapted for engagement with said mounting clips to provide a completed mounting assembly having an over-all aesthetic appearance.

Another object of this invention is to provide a partition assembly which is so designed as to facilitate installation thereof and which is so constructed as to be readily adaptable to a variety of different applications.

These and other objects of this invention will become apparent when reading the accompanying description and drawings in which:

FIGURES 1a, 1b and 1d are perspective views of clips employed in the mounting assembly of the instant invention.

FIGURES 1c, 1e and 1f are perspective views of cover plates which are used with the clips shown in FIGURES 1a, 1b and 1d respectively. FIGURE 1g is a perspective view of a metal spring clip employed for securing the plates of FIGURES 1c, 1e and 1f to the clips of FIGURES 1a, 1b and 1d respectively.

FIGURES 3a–3d are sectional views and FIGURES 3e–3g are perspective views showing the mounting assemblies of the instant invention employed in a variety of different applications.

FIGURES 4a and 4b are sectional views of mounting members employed in the partition assembly of the instant invention for joining adjacent movable partitions to form a corner therebetween.

FIGURE 5 is a side elevational view showing a floor-to-ceiling installation of the instant invention in schematic form.

FIGURE 6 is a perspective drawing showing a portion of the window assembly of FIGURE 3e.

FIGURE 7 is an end view of another embodiment of the instant invention.

FIGURE 8 is a perspective view showing another embodiment of the instant invention for a window assembly.

FIGURE 9 is an end view of still another embodiment of the instant invention employing a window assembly.

FIGURES 10a–10c are side, end and side views respectively, of a floor mounting assembly of the instant invention.

Figure 2:
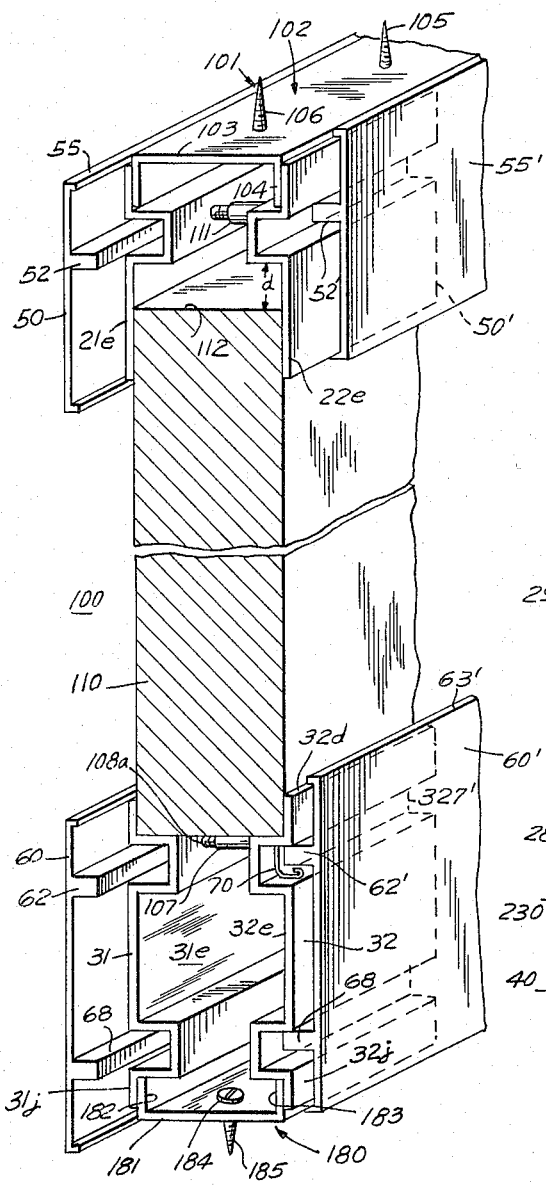
FIGURE 2 is a perspective view of one mounting assembly employing the plates and clips set forth in FIGURES 1a–1g.

Referring now to the drawings:

FIGURE 1a shows the clip arrangement 10 which is comprised of cooperating clips 11 and 12. Clips 11 and 12 each have a yoke 11a and 12a and arms 11b, 11c and 12b, 12c extending from the yoke portions 11a and 12a respectively. The clips 11 and 12 are aligned with respect to one another so that arm 11b extends in the direction away from arm 12b and arm 11c extends in the direction away from arm 12c. Arms 11b and 11c are provided with flanged portions 11d and 11e which extend away from the yoke portion 11a. Clip member 12 has the identical construction whereby arms 12b and 12c are provided with flanged portions 12d and 12e. Thus, clip 11 has a channel 11f throughout its entire length between the flanges 11d and 11e and likewise clip 12 has a channel 12f along its entire length between flanges 12d and 12e. A plurality of apertures 11g are provided along yoke 11a at spaced intervals thereof. Yoke 12a is provided with apertures 12g so that with the clips 11 and 12 positioned as shown in FIGURE 1a the apertures 11g and 12g are in alignment for the purpose of receiving fastening means (not shown) for a purpose to be more fully described.

FIGURE 1b shows a second clip arrangement 20 comprised of the clip members 21 and 22. Clip members 21 and 22 are similar to the clip members 11 and 12 of FIGURE 1a with the exception that their lower arms 21e and 22e are longer than the like arms of the clips 11 and 12, shown in FIGURE 1a.

FIGURE 1c shows another clip arrangement 30 comprised of clip members 31 and 32. The clip members 31 and 32 differ from the clip assembly 20 of FIGURE 1b in that each of said clip members are provided with two channels 31f, 31h, and 32f, 32h respectively, and further that the clips 31 and 32 have flat central portions 31e and 32e separating the channels 31f, 31h and 32f, 32h respectively.

FIGURE 1d shows a plate 40 which may be employed with the clip assembly 10 of FIGURE 1a and is comprised of a central body 41 having a projection 42 running along its entire length and positioned intermediate its top and bottom edges. The top edge is flanged to form a lip 43 and the bottom edge is flanged to form a lip 44. Plate 40 is so designed that the projection 42 is adapted to be received by the channel 12f (for example), and the lips 43 and 44 are designed to curve around the top and bottom edges of the flanges 12d and 12e when the projection 42 is seated in channel 12f. This arrangement is shown in FIGURES 2a and 2b, which will be more fully described.

FIGURE 1g shows a spring retaining means 70 having a yoke 71 and extending arms 72 and 73, the ends of which are bent so as to form the substantially U-shaped configurations 74 and 75. Spring retaining means 70 are adapted to be seated within the channels of the clip assemblies 10, 20 or 30, in such a manner that the yoke portion 71 is seated in the channel such as (for example), channel clip 12f of clip 12 and is further adapted to receive the projection 42 in the region 76 between arms 72 and 73 so as to rigidly position and secure plate 40 (for example) to clip 12 and to facilitate removal thereof, if and when removal is desired.

FIGURE 1e shows a plate 50 which is similar to the plate 40 of FIGURE 1d, except that the portion 56 between projection 52 and flange 54 is dimensioned so that with projection 52 seated in channel 22f of clip 22 (for example), the lip 53 curves around the top edge of flange 22d, while the lip 54 curves around the bottom edge of flange 22e.

In a like manner, the plate 60, shown in FIGURE 1f, is provided with two projections 62 and 68, which are so spaced that with projection 62 seated in channel 32f of clip 32 (for example), projection 68 will be seated in channel 32h. Lip 63 will curve around the top edge of flange 32d and lip 64 will curve around the bottom edge of flange 32j. In a like manner, spring retaining means of the type 70, shown in FIGURE 1g, are employed for the purpose of securing the plates 50 and 60 to the clip members 22 and 32 respectively.

The rear surfaces 45, 55 and 65 of plates 40, 50 and 60 respectively, are finished in such a manner that they are aesthetically appealing to the eye, thereby giving the partition assembly, upon completion of the installation thereof, an over-all appealing appearance which contributes to the aesthetic appeal of the region which is being partitioned.

Figure 2A:
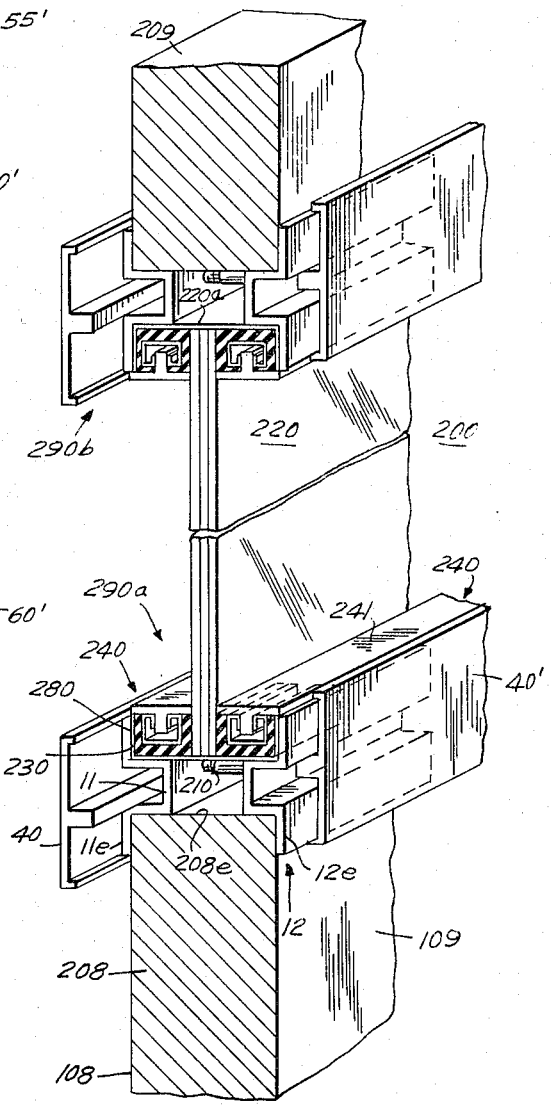
FIGURE 2a is a perspective view of the mounting means of FIGURES 1 and 2 for mounting partitions with windows.

FIGURE 2 shows a typical partition assembly installation 100 employing the mounting assemblies of FIGURES 1a–1g and is comprised of a ceiling channel 101 having a yoke 102 and extending arms 103 and 104. The channel 101 is provided with a plurality of spaced apertures 105 for receiving fastening means such as fastening means 106, for securing channel 101 to the ceiling. It should be understood that the use of channel 101 is not limited to the application of being secured to a ceiling, but channel 101 may be secured to any surface or member depending upon the installation desired and this will be more fully understood and appreciated in the description of the variety of applications shown in FIGURES 3a-3j in the instant application.

The channel 101 may be of any desired length and has been shown sectionalized in FIGURE 2 simply for the purpose of clarity. A similar channel 180 is provided having a yoke 181 and extending arms 182 and 183. The yoke 181 has a plurality of spaced apertures 184, only one of which is shown in FIGURE 2, for receiving fastening means such as the fastening means 185. The arrangement of FIGURE 2 permits the channel 180 to be secured to a floor via fastening means 185, but as explained above, the use of channel 180 and fastening means 185 is by no means limited to the application of being secured to a floor but may be secured to any other surface desired. Again it should be understood that the channel 180 has been sectionalized in FIGURE 2 for the purpose of clarity and may be of any desired length. This holds true also for the remaining elements employed in the partition assembly 100 of FIGURE 2. The mounting clips, however, have predetermined lengths as will be more fully described.

Partition assembly 100 further includes clips 31 and 32 which are positioned so that the flanges 31j and 32j abut about arms 182 and 183 of channel 180. The clips 31 and 32 are secured to one another by fastening means such as the fastening means 107 which is inserted through the aligned apertures 31g-32g and 31k-32k (see FIGURE 1c), which are provided in channels 31f-32f and 31h-32h of the caps 31 and 32 respectively, shown in FIGURE 1c. The fastening means 107, when tightened the proper amount, urges the cap members 31 and 32 toward one another causing channel 180 to be firmly clamped between flanges 31j and 32j of clips 31 and 32. A panel member 108 is positioned above clips 31 and 32 so that the opposite sides of its lower edge 108a rests on the outward surfaces 31m and 32m of arms 31b and 32b respectively and further so that the front and rear faces 109 and 110 are positioned between the flanges 31d and 32d of clips 31 and 32. In a like manner, the fastening means 107 causes panel 108 to be firmly clamped between the flanges 31d and 32d.

The upper channel 101 has its arm 103 and 104 clamped in a similar manner between the clips 21 and 22 which are adapted to receive fastening means through their spaced cooperating apertures 21g and 22g (see FIGURE 1b) for receipt of fastening means such as the fastening means 111. The lower flanges 21e and 22e are adapted to receive the upper end 112 of the panel 108 and serve to firmly clamp panel 108 therebetween. It should be noted that the flanges 21e and 22d are so dimensioned as to provide a space d between the upper surface 112 of panel 108 and the arms 21c and 22d in order to compensate for a floor and ceiling construction which are not in exact parallel relationship. This can more clearly be seen by reference to FIGURE 5 in which the line f represents the floor and the line c represents the ceiling. It should be understood that although this example grossly exaggerates what occurs, it is felt that the exaggeration better clarifies the situation. The clamp 22 is secured to the ceiling c in the manner previously described and receives the panel 108 beneath its lower flange 22e. As can be noted in FIGURE 5 the flange 22e is of a width substantial to cover the left hand end of panel upper surface 112 shown in dotted fashion and further adequately covers panel 108 at the right hand end. This arrangement permits panels 108 to be prepared by being cut in a rectangular configuration and no consideration need be given to cutting panels 108 so that they have an irregular outline to compensate for non-parallel floors and ceilings due to the dimensions of flange 22e. This arrangement greatly facilitates the installation of the partition assembly.

The only consideration that need be given in the preparation of the panels 108 is that the distance from the lower edge 108a to the upper edge 112 be sufficient to permit the panel 108 to be clamped between lower flanges 31d, 32d and upper flanges 21e, 22e. The panels 108 may be formed of any desired building material, such as wood, dry wall, etc. and need be wide enough so that the width is somewhat greater and the distance between the facing inner surfaces of the flanges 31d, 32d and 21e, 22e, the surfaces 109 and 110 of panel 108 may be finished in any desired manner depending strictly upon the needs of the user. For example, if wood panels are used, they may be stained, painted, lacquered, etc. If a dry wall panel is employed it may be painted or papered, or covered with any other covering material desired such as a cloth material, for example.

The lower clips 31 and 32, after installation thereof, are provided with a plurality of spring retaining means 70 which are positioned at spaced intervals along the channels 31f-31h and 32f-32h respectively. After insertion of spring retaining means 70, the plates 60 and 60' are positioned so that their projections 62-68 and 62'-68' are seated in the openings 76 (see FIGURE 1g) of the spring retaining means 70 provided in the clip channels. The spring retaining means 70 provide sufficient tension so that the arms 72 and 73 bear against the arms 32m and 32n, for example, of channel 32f, as shown in FIGURE 1c. This is due to the curved profile of the yoke 71 as shown in FIGURE 1g. In a like manner, the substantially C-shaped portions 74 and 75 of spring retaining means 70 are designed to bear against the opposite surfaces of projection 62', for example, causing spring retaining means 70 to serve the dual purpose of being secured within the channel 32f and rigidly positioning and securing projection 62' to channel 32f and clip 32. The plate 60' positioned as shown in FIGURE 2, the upper lip 63' curves around the upper edge of flange 32d and the lower lip 64' curves around the lower edge of flange 32j. The lips 62 and 63 of plate 60 are filled in a like manner. The outer surfaces 65 and 65' of plates 60 and 60' respectively are finished so as to provide a surface which is aesthetically appealing.

The upper clips 21 and 22 are provided with spring retaining means 70 (not shown), in their channels 21f and 22f respectively, in the same manner as described with respect to clips 31 and 32 of FIGURE 2. The spring retaining means 70 secure the plates 50 and 50' to the respective clips 21 and 22, in the same manner as previously described with respect to clips 31 and 32, by bearing upon the opposing surfaces of the plate projections 52, 52' of plates 50 and 50' respectively. The surfaces 55 and 55' of plates 50 and 50' are finished in a manner similar to the manner in which plates 60 and 60' are finished so as to provide the desired aesthetic appeal. The finish provided may be that of simply polishing the surfaces 50 and 55', etching them or performing any other form of polishing or engraving which may be desired by the user.

The central portions 31e and 32e of clips 31 and 32 are of sufficient width to form a passageway therebetween adequate to receive one or a plurality of conduits which may be, for example, electric conduits or telephone conduits. The passageway provided between clips 31 and 32 acts to totally conceal any conduits contained therein, protects these conduits from any harmful outside influences and permits removal of the clips for inspection, maintenance or repair of the conduits contained in the passageway. The conduits may be observed simply by removing one of the plates, such as for example, the plate 60', loosening and removing the fastening means 107 and removing the clip 32 positioned beneath plate 60' so that the conduits contained in the passageway may be readily observed. The panel 108 need not be removed since it will bear upon the arm 31m of clip 31 for adequate support thereof.

If it is desired to provide a partition assembly similar to the partition assembly 100 shown in FIGURE 2, but, in which no conduit passageway is required, the clips 31 and 32 may be replaced by the clips 11 and 12 shown in the clip assembly 10 of FIGURE 1a. The only other alteration required with this arrangement is that of providing a panel such as the panel 108, having vertical dimensions somewhat greater than the panel 108 of FIGURE 2, in order to compensate for the shorter flanges 11e and 12e of clips 11 and 12.

FIGURE 2a shows a partition assembly window arrangement 200 for accommodating a window when a partition assembly of this arrangement is so desired. The window assembly 200 of FIGURE 2a is comprised of lower and upper panels 208 and 209, the lower and upper ends respectively having been sectionalized for purposes of clarity. However, it should be understood that panel 208 may be inserted into a clamp arrangement in the same manner as the lower end of panel 108 of FIGURE 2 and the upper panel 209 may be mounted in the same manner as the upper end of panel 108 of FIGURE 2. A pair of clips 11 and 12 are positioned along the upper corners of edge 208a of panel 208 so that the flanges 11e and 12e clamp the upper end of panel 208 therebetween. Fastening means 210 are provided to firmly clamp clips 11 and 12 to the upper end of panel 208 in the same manner as was previously described with respect to FIGURE 2. Positioned between the flanges 11d and 12d of clips 11 and 12 is a channel 280 which is substantially similar to the channel 180 of FIGURE 2. The glass pane 220 is then placed so that its lower edge rests on the upper surface of channel 280. Positioned on opposite sides of glass pane 220 and at spaced intervals within the channel member 280 are a plurality of U-shaped resilient members such as, the U-shaped resilient member 230 shown in an enlarged view in FIGURE 6. A spring clip 70 is seated in the channel of resilient member 230 in a manner similar to that described previously with respect to the channels of the clip assemblies 10, 20 and 30 previously described. A substantially T-shaped member 240 shown in an enlarged view in FIGURE 6 is inserted in the channel formed by the resilient members 230 and between the extending arms 72 and 73 of the spring retaining means 70. This arrangement causes the resilient members 230 to exert forces directed towards the pane 220 and further directed towards the flanges 11d and 12d. When the fastening means 210 are fastened securely, the flanges 11b and 12b exert forces against resilient members 230 thereby causing glass pane 220 to be firmly clamped between the facing arms of the adjacent resilient U-shaped members shown in FIGURE 2a. The upper surfaces 241 of the key members 240 are finished or polished in the same manner as previously described with respect to plates 40, 50 and 60, in order to provide an aesthetically appealing finish. Plates 40 and 40' are then positioned so that their projections 42 and 42' are received by channels 11f and 12f of clips 11 and 12 in the same manner as was previously described with respect to FIGURE 2. Spring retaining means 70, which are inserted along spaced intervals in channels 11f and 12f cause the plates 40 and 40' to be substantially rigidly secured to clips 11 and 12 respectively. The upper clamping assembly for clamping the upper edge of window pane 220 is identical to the arrangement described immediately above and the above description applies equally well to the upper mounting assembly 290 for mounting the upper edge 220a of window pane 220 to the upper panel 209.

If it is desired to provide a passageway immediately above or below the window pane 220, when passageway is of the type formed between the clips 31–32 shown in FIGURE 2, clips 11 and 12 may be removed and substituted by clips 31 and 32 thereby providing a passageway adequate to receive either electrical or telephone conduits, or both, depending upon the needs of the user.

FIGURE 8 shows an alternative embodiment for positioning and supporting the window pane 220 as shown also in FIGURE 2, which assembly consists of first and second pressure mount members 701 and 702 having inwardly facing cooperating flanges 701a–701b and 702a–702b, respectively, which flanges are adapted to firmly clamp the window pane or other suitable transparent member 220 therebetween. It should be understood that this structure is substituted for the arrangment shown in FIGURE 2a and is adapted to be positioned between the lower clamping arms of upper mounting assembly 290b and between the upper clamping arms of lower mounting assembly 290a shown in FIGURE 2a.

FIGURE 9 shows still another alternative embodiment for mounting transparent panes and is comprised of upper and lower channel members 751 and 752. The opposing flanges 751a and 751b of the lower channel 751 are spaced apart sufficiently close enough so as to apply pressure to the pane. The clamping pressure is provided by the substantially U-shaped rubber stripping 753 which fits flanges 753a and 753b sandwiched between the opposite faces of the pane 220 and the flanges 751a and 751b of the channel member 751, thereby adequately positioning and securing the transparent member 220 therebetween. It should be understood that the upper channel member 752 functions in the same identical manner and it should further be noted that the entire structure, including the channel members, the U-shaped rubber members, and the glass pane, is completely substituted for the glass pane mounting structure, FIGURE 2a, so that the lower channel member 751 is received by the upper clamping arms of mounting assembly 290a and the upper channel member 752 is received by the lower clamping arms of the mounting means 290b which are shown in FIGURE 2a.

The intersecting assembly 300 shown in FIGURE 3a is provided for the purpose of mounting one vertical side of a partition to a wall or some other vertical surface. The assembly 300 is comprised of a channel 180' having a yoke 181' and extending arms 182' and 183'. The yoke 181' is provided with a plurality of spaced apertures 184' (only one of which is shown) for the receipt of fastening means 301 for fastening channel 180' to the vertical surface 302. The clips 11' and 12' are positioned so that their flanges 11e' and 12e' abut the arms 182' and 183' of channel 180'. The opposite flanges 11d' and 12d' abut the outer surfaces of panel member 108'. The fastening means 303, spring clips 70' and plates 40 and 40' are then mounted to clips 11' and 12' in the same manner as described with respect to FIGURE 2a. This arrangement thereby provides a means for simply and readily joining the right hand edge (for example) of a vertically mounted panel 108' to another vertical surface 302, such as for example, a wall. It should be understood that FIGURE 3a is a view of the intersecting assembly looking down from the top of assembly wherein the assembly and panel 108' extends upward perpendicularly from the plane of FIGURE 3a.

When it is desired to provide a connection between vertically aligned panel which intersects other vertically aligned panels, the arrangement 350 of FIGURE 3b is provided wherein the vertically aligned walls 108', 108'' and 108''' are interconnected by means of first and second mounting assemblies 300 and 360 respectively. The mounting assembly 300 of FIGURE 3b is identical to that of FIGURE 3a except for the employment of a different type of fastening means 351 which replaces the fastening means 301 of FIGURE 3a. Thus the joinder of panel member 108' to the mounting assembly 300 of FIGURE 3b is identical to the joinder of panel 108' to the mounting assembly 300 of FIGURE 3a, as was previously described.

The panel members 108″ and 108‴ are secured to one another and to the panelboard 108′ via the mounting assembly 300 by means of a mounting assembly 360 which is comprised of a clip 11 which is so positioned that its arms 11b and 11c and yoke 11a are positioned between the facing edges of panel members 108″ and 108‴. The aperture 11g provided in yoke 11a is adapted to receive a bolt 351 which is of a length sufficient to further be threaded through the aperture 184′ provided in channel member 180′. A nut 352 threadedly engages a bolt 351 and the combination provides the means for fastening channel 180′ to clip 11 thereby causing panel members 108″ and 108‴ to be firmly clamped between the yoke 181′ of channel 180′ and the flanges 11d and 11e of clip 11. The spring clips, such as the clip 70′, 70″ and the plate 40″ are then positioned thereby completing the mounting assembly 360. It can therefore be seen that the mounting assembly 360, which requires only one-half of the elements shown in the mounting assembly 300, serves the dual function of joining a wall comprised of panels 108″ and 108‴ to an intersecting wall 108′ while at the same time firmly clamping the panels 108″ and 108‴ to form a uniform straight wall configuration.

FIGURE 3c shows the mounting assembly basically of the type shown in FIGURE 3a employed for the purpose of assembling a door frame element such as the door frame element 401 of FIGURE 3c to a panel member 108′.

In the description of the arrangement of FIGURE 3c, it should again be understood that the door 440 in panel member 108′ and the mounting assembly are all vertically aligned so that they are positioned perpendicular to the plane of FIGURE 3c. The door frame member 401 is comprised of a main body portion 402 having first and second arms 403 and 404 extending in a first direction. The opposite side of central portion 402 has a projection 405 which is provided with a substantially U-shaped notch 405a for receiving a resilient cushioning means such as a piece of rubber stripping having a projection so as to be received by notch 405a and aiding in the cushioning of a door closure in which an impact occurs between the projection 405 and the adjacent edge of the door 440.

The clamping, or mounting assembly of FIGURE 3c is identical to the mounting assembly 300 of FIGURES 3a and 3b, wherein the left-hand most flanges of clips 11′ and 12′ firmly clamp the left-hand edge of panel member 108′ and the left-hand flanges of clips 11′ and 12′ firmly clamp the arms 403 and 404 of member 401 therebetween. The door frame member 411 positioned across from frame member 401 is clamped to a similar panel, not shown, by a mounting means, also not shown, of the same type as the mounting means shown on the right-hand side of FIGURE 3c. Member 411 is identical in structure to door frame member 401 except that in this case it is the mirror image of door frame member 401. Member 411 is provided with a hinge 430 having a first arm 432 secured by suitable fastening means to frame member 411 and a second plate 431 secured by suitable fastening means to the door frame 440. Arms 431 and 432 pivot about the pivot points 430a of hinge 430 causing the door frame 440 to rotate clockwise about pivot points 438 for an opening operation and counterclockwise about pivot 430a for a closing operation.

FIGURE 3d shows an arrangement for mounting a door frame member 401 to a vertically aligned panel 108′ except that in this particular case clips 11′ and 12′, as shown in FIGURE 3c, have been substituted by clips 31′ and 32′, which in this arrangement provides a passageway 460 for receiving conduits, such as electrical or telephone conduits therethrough. It should be understood that this arrangement is necessary only when such type wiring is required by the user.

FIGURES 3f and 3g show the mounting assemblies employed in mounting vertically aligned panels which are positioned end to end through one another. The arrangement 500 of FIGURE 3f employs clips 11′ and 12′, fastening means 501, spring clips (not shown), of the type shown in FIGURE 1g, and plates 40 and 40′, all of which have been described previously. The mounting assembly 550, of FIGURE 3g differs from the assembly 500 of FIGURE 3f in that the clips 11′ and 12′ have been replaced by the clips 31′ and 32′ where it is desired to provide a passageway such as passageway 551 for the receipt of electrical, or telephone conduit therethrough.

In cases where it is desired to provide a substantially L-shaped intersection, the arrangements of FIGURES 4a and 4b may be employed. In the arrangement shown in FIGURE 4a, where it is desired to couple vertically aligned intersecting wall panels 108′ and 108″ so as to provide an open corner arrangement, the connecting member 650 is employed, which member 650 is comprised of substantially perpendicularly aligned arms 651 and 652. Arm 651 is provided with projections 653 and 655, having lips formed at their end, and having stop means 675 and 676 aligned along their interior facing walls. These provide for the receipt and positioning of the end of vertically aligned wall panel 108″. In a like manner, arm 652 is provided with projections 654 and 656 which are curved inwardly in a like manner and which are further provided with stop means 677 and 678 for receiving and positioning vertically aligned wall panel 108′. The arm 652, as shown in the insert of FIGURE 4a, is provided with a substantially circular projection 691, which is received by the substantially circular groove 698 provided at the extreme right hand end of arm 652. This ball and socket arrangement permits the alignment of the panels 108′ and 108″ at an angle other than a perfect right angle.

The arrangement of FIGURE 4b provides a squared off corner, an L-shaped member 671, having inwardly directed flanges 672 and 673, which are joined to the arms 651 and 652 in any suitable manner. This arrangement provides a closed, or squared off corner. It should be understood that the outer exposed surfaces of the assemblies 650 and 670 of FIGURES 4a and 4b respectively are finished in an aesthetically appealing manner, in the same manner as previously described with respect to the finished surfaces of the plates 40, 50 and 60 of FIGURES 1d–1f, respectively. It should be noted that the L-shaped member 671 need not be perfectly rectangular since the ball and socket arrangement, as more clearly shown in FIGURE 4a, compensates for any misalignment which may occur.

FIGURE 3e shows a mounting assembly 600 for the purpose of providing rail type partitions in situations where floor to ceiling partition assemblies are neither required nor desired. The rail type assembly 600 is comprised of a mounting plate or base plate 601, having reinforcing rods comprised of two steel bars 606 and 607 mounted thereto so that steel bars 606 and 607 extend perpendicular to the plane of FIGURE 3a and out of the plane of FIGURE 3e. A first mounting clip 601a is mounted to the mounting plate 601 so that it likewise extends outward from and perpendicular to the plane of FIGURE 3e. The height of the mounting clip 601a is as shown in the mounting assembly 600 of FIGURE 3e, while the metal bars 606 and 607 are approximately one-half to two-thirds of the over-all height of mounting clip 601a. The mounting clip 601a and the steel bars 606 and 607 are then suitably welded to one another. The second mounting clip 611 is then positioned relative to the mounting clip 601a for cooperation therewith. Suitable fastening means (not shown) are then positioned in the apertures provided along the clips 11 and 12. A vertically aligned panel 108′ is then positioned so that its left hand most edge is firmly clamped between the cooperating flanges 11d and 12d of clips 11 and 12 respectively and remain firmly clamped therebetween by means of tightening the fastening means mentioned previously. It has been found that the employment of the steel bars 606 and 607, which are welded together with mounting clips 601a provides an extremely substantial amount of strength for supporting and positioning the vertically aligned panel members 108' so that even after long periods of use no wobbling whatsoever has been noted.

FIGURES 10a, 10b and 10c show still another problem encountered in movable partition assembly applications and a solution of the particular problem respectively.

FIGURE 10a shows a plurality of mounting clips 11, 11' and 11", which are suitably secured to the supporting surface, or floor, 901. As can be noted, the supporting surface 901, instead of being perfectly flat, is uneven, or "wavy." In this particular example, the unevenness has been exaggerated in order to better clarify the problem encountered in such applications. Each mounting clip 11–11" is provided with a groove 11f–11f" represented here simply by a solid line. As can clearly be seen in FIGURE 10a, due to the unevenness of the supporting surface 901 beneath the mounting clip 11', the channel 11f' falls below the straight line 902 joined between the channels 11f and 11f", thus, in order to insert the mounting plate appropriately into the grooves 11f, 11f' and 11f", of the associated mounting clips, a severe side-wise force is imposed upon the mounting plate projection which cooperates with the clip member channels, which is substantial enough to completely prevent the insertion of the cooperating mounting plate, thus, completely preventing the use of the aforementioned mounting assemblies in and upon supporting surfaces exhibiting an extreme degree of unevenness. The mounting assembly 950 of FIGURE 10b completely overcomes this particular problem.

The mounting assembly 950 is comprised of a channel member 951 similar to those described previously and provided with suitable apertures at spaced intervals along its length, such as the aperture 952, for example, for receipt of suitable fastening means 953 for securement to the supporting surface 901. The arms 951a and 951b of channel member 951 are bent towards one another slightly, for a reason to be more fully described. Mounted upon channel member 951 is a mounting clip 960 of substantially U-shaped profile and having a suitable aperture 961 at its base for cooperating with the aperture 952 in channel member 951 for securement thereof to the supporting surface 901, by means of fastening member 953. The clip member 960 is bent so as to form two channels 962 and 963 therein, said channel having suitable apertures 962a and 962b for receipt of fastening means 964. The upper arms 965 and 966 extending above channels 962 and 963, respectively, are provided for clamping the vertically aligned panel member 967 therebetween. It should be noted that the mounting clip 960 may be formed of any suitable material sufficient to give adequate supporting and positioning strength to the vertically aligned panel member 967, while at the same time completely ignoring the aesthetic appearance of the mounting clip 960, as will be more fully understood. In order to provide an over-all aesthetic appearance for the mounting assembly 950 of FIGURE 10b, the cover plates 980 and 990 are provided, which may be made of any suitable material, such as for example, a rigid plastic material, or even an aluminum material if desired. Since both clips are identical in structure and function, only one will be described herein for the purpose of simplicity.

The cover plate 980 has a main body portion 981, having an upper flanged portion 982 extending therefrom and towards the vertically aligned panel member 967. Near the bottom edge thereof and along the inside surface is provided a substantially S-shaped projection 983 extending from body portion 981. The configuration of the projection 983 is such that with the mounting plate 980 positioned as shown in FIGURE 10b, projection 983 cap-
tures between its lower end and between the inner wall of main body portion 981, the arm 951a of channel member 951. Projection 983 is so constructed as to provide a forced fit for the channel arm 951a. Since the channel arm 951a is bent towards the direction of the cooperating channel arm 951b, this causes the upper end of mounting plate 980 to be urged in the direction shown by arrow 995, thereby causing the upper flange 982 to bear against the surface of vertically aligned panel 967. In this manner, the mounting plate 980 is not dependant upon the complete flatness of the supporting surface in order to provide an easily mountable mounting plate which is not the case with the embodiment described previously. This is provided for by constructing the channel arms 951a and 951b to be of a length sufficient and the projections 983 to be of a configuration sufficient so as to completely overcome any unevenness of the supporting surface 901.

In order to effectively seal the region bounded by the cover plates 980 and 990, the upper flange 982 is provided with a substantially flexible end 982a which upon the slightest pressure is adapted to yield, thereby conforming exactly to the surface upon which it bears. This has the feature of completely closing any spacing between the upper flange 982 and the adjacent surface of the vertically aligned panel member 967. A further advantage can be seen when considering FIGURE 10c which shows the completed assembly 950 of FIGURE 10b cooperating with an intersecting vertical mounting assembly 911'. Since the cover plate of the vertically aligned intersecting mounting assembly 911' extends somewhat from the surface 967 of the vertically panel member, the flexible portion 982a of the mounting plate 980 curves around the edges thereof thereby providing a neat and completely sealed partition assembly. As a further advantage, it should be noted that in FIGURE 10b the vertical mounting clip 911', since it extends slightly below the flange 982, need not be cut to an exact size as long as it is cut to a length sufficient so that its lower edge lies below the flange 982. Thus, it is evident that with the cover plate 980 in the proper position, any deviation in the length of the vertically aligned mounting assembly 911' is of no consequence so long as its lower edge lies at least to some degree below the upper flange 982.

The lower edge of body member 981 of cover plate 980 is likewise provided with a flexible tip 981a which upon the slightest pressure applied thereto is adapted to yield to the surface applying such pressure. Thus, with the supporting surface 901, as shown in FIGURE 10b, the flexible tip 981a is bent almost completely at a right angle. However, it should be appreciated that with the uneven condition, as shown by the supporting surface 901 in FIGURE 10a, this flange 981a will be in a position 981a' as shown in dotted fashion in FIGURE 10b, thereby completely sealing any open spacing between the lower edge of the cover member 990 and the supporting surface 901.

If it is desired to provide a rail type partition, wherein a portion of said partition has a window pane, this is readily performed by providing a mounting arrangement 290a" which is identical to the mounting arrangement 290a of FIGURE 2a described previously, for the purpose of firmly mounting the pane 220' to the vertically aligned panel 108'. The left hand edge of pane 220' is firmly clamped between clips 11 and 12 by providing a mounting assembly 290a", having elements which are identical to the mounting assembly 290a of FIGURE 2a. Upon completion of these mounting assemblies, the clips 11 and 12 are then cut at their top edges so that they stand at a height slightly above the upper edge of the window plate 220'. Clips 11 and 12 are then covered by a cover plate 603, shown in dotted fashion, for covering the upper surfaces thereof. It should be understood that the outer exposed surfaces of cover 603 will be finished in an aesthetically appealing manner. It should then be understood that clips 11 and 12 are then provided with spring clips of the type of spring clips 70 of FIGURE 1g and then are provided with plates of the type 40 and 40' which are positioned in the manner identical to that shown in FIGURES 3f, 3a and 3b. It should be understood that the upper edge of the plates will be positioned so that they will be beneath the downward lips of the cover 603, such as the downward lips 603a of cover 603. Mounting assembly 290a", which is used in the horizontal mounting arrangement, is also provided with the finished plates such as plate 40 shown in FIGURE 3e. Assuming that the window plate, such as the window plate 220' and the vertically aligned panel, such as the aligned panel 108' are cut in perfectly rectangular arrangements, such that the floor level upon which they are to be used is completely disregarded, this presents no problem, even assuming that the floor is not perfectly level. Assuming that the floor rises somewhat from one end of the room to the other, this is compensated for completely, simply by cutting the tops of the clips 11 and 12 to the appropriate level so that the cover means 603, when seated upon the top edges of clips 11 and 12 will be immediately above the top edge of the pane 220. The flanges 11e and 12e of clips 11 and 12 of FIGURE 3e, which extend towards the left, receive a channel member 101' the outer surface of which is finished so as to provide an aesthetically appealing surface on all three sides of the post arrangement of rail type partition assembly 600.

An alternative embodiment of the mounting assembly of the previous figures is shown in FIGURE 7, which is comprised of a clip member 701. Clip member 701 is somewhat similar to the clip members 11 and 12 shown in FIGURE 1a, except that the central portion 704 thereof is designed so as to define an opening 702 by means of extending portions 741 and 745. The opening 702 defined therebetween, is provided for the purpose of seating an elongated strip, such as the elongated plastic strip 703. This plastic strip may be of any color and may further be provided with either a dull or glossy finish. Since the strip is easily removable, and/or insertable, the strip may be provided to blend with the decor of the room or area in which the mounting assembly is to be employed. It should be further understood that the outer surfaces of the mounting member, or plate 701, may likewise be polished or finished, so as to provide a surface offering aesthetic appeal to the observer.

The clip member 711, which cooperates with the plate member 701, is similar to the plates 11 and 12, shown in FIGURE 1a of the drawings, except that additional bent portions 712 and 713 are provided to accommodate for the rear portion 704 of plate 701, which extends towards clip 711. The spring clip means 770 is seated in the channel of clip member 711, in the same manner as that described previously with respect to the clip members 11 and 12 of FIGURE 1a. Clip member 711 is secured in the same manner as clip members 11 and 12 previously described, by means of apertures, such as for example, the aperture 715, provided in its central portion. It should be further understood that a second portion of the mounting assembly, which is the exact mirror image of the assembly shown in FIGURE 7, complements the assembly of FIGURE 7 to complete the mounting assembly, in the same manner as that shown in FIGURES 2 and 2a of the drawings previously described. It can thus be seen that this arrangement provides, in addition to an aesthetic mounting assembly, a means by which insertable plastic strips may be changed in order to blend in with the change in the decor, that is, that these plastic strips may be removed at any time after insertion thereof, so that the molding aesthetically blends in with the remainder of the room decor.

It can therefore be seen that this invention provides a partition assembly which is comprised of elements which are easily installable, provides more than adequate strength for the elements which they support, completely compensate for any misalignment between floors, ceilings, or walls in a particular room in which they are to be used, and further to provide passageways for electrical conduits and the like which completely conceals such conduits and protect them from outside influences and which may be opened quite readily for inspection or maintenance purposes.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A partition assembly for use with panel members for forming a movable partition comprising a mounting assembly for positioning and securing panel members between two surfaces, said mounting assembly including an elongated channel member having a pair of arms extending in a first direction; a plurality of first and second mounting clips positioned at spaced intervals along the panel member, each having a central portion and first and second flanges extending in opposite directions from said central portion; said central portion having a channel; said first and second clips being mounted to clamp said channel member extending arms between said first flanges and the marginal edge of said panel member between said second flanges; said first and second clip channels having cooperating apertures in alignment with one another; fastening means positioned through said apertures for urging said clips towards one another to clamp said panel member and said channel member therebetween; the length of said clips being substantially less than the length of said channel member; spring retaining means positioned within said clip channels; at least one plate member for concealing all of said clips comprising a substantially flat plate having a first surface; a projection on said first surface running the length of said flat plate intermediate the edges thereof; the second surface of said flat plate opposite said first surface being finished to present an appealing appearance; said spring retaining means making frictional engagement with said channel; said spring retaining means having extending arms for receiving said flat plate projection; said flat plate completely concealing associated clips when said projection is positioned in said channel; the length of said plate being substantially equal to the length of said channel member for completely concealing all of said clips.

2. The assembly of claim 1 wherein said flat plate second surface is provided with an opening along its length being defined by first and second extending portions arranged in spaced parallel fashion; an elongated strip being removably inserted in said elongated opening and being of a color to blend with the decor of the area in which the mounting assembly is employed.

3. A partition assembly for use with panel members for forming a movable partition comprising a mounting assembly for positioning and securing panel members between two surfaces, said mounting assembly including an elongated channel member having a pair of arms extending in a first direction; a plurality of first and second mounting clips positioned at spaced intervals along the panel member, each having a central portion and first and second flanges extending in opposite directions from said central portion; said central portion having a channel; said first and second mounting clips being mounted to clamp said channel member extending arms between said first flanges and the marginal edge of said panel member between said second flanges; said first and second clip channels having cooperating apertures in alignment with one another; suitable fastening means being received by said apertures urging said mounting clips towards one another to clamp said panel member and said channel member therebetween; the first arm of each of said mounting clips being longer than the second arm; said mounting assembly being mounted to an overhead surface with said clip second arms adjacent said overhead surface; said first arms concealing any misalignment between an overhead surface and a supporting surface to present an over-all pleasing appearance; the length of said mounting clips being substantially less than the length of said channel member; spring retaining means positioned within said clip channels; at least one plate member for concealing all of said clips comprising a substantially flat plate having a first surface; a projection on said first surface running the length of said flat plate intermediate the edges thereof; the second surface of said flat plate opposite said first surface being finished to present an appealing appearance; said spring retaining means making frictional engagement with said channel; said spring retaining means having extending arms for receiving said flat plate projection; said flat plate completely concealing associated clips when said projection is positioned in said channel; the length of said plate being substantially equal to the length of said channel member for completely concealing all of said clips.

4. A partition assembly for forming a movable partition having a window portion comprising a mounting assembly for positioning and securing a transparent member to a panel member, said mounting assembly including a first elongated channel member having a pair of arms extending in a first direction; a plurality of first and second mounting clips positioned at spaced intervals along the transparent members, each having a central portion and first and second flanges extending in opposite directions from said central portion; said central portion having a channel; each of said first and second mounting clips being mounted to clamp said channel member extending arms between said first flanges and the marginal edge of said panel member between said second flanges; each of said first and second channels having cooperating apertures each being in alignment with one another; fastening means being received by said apertures; first and second resilient members positioned in said channel member for receiving therebetween the marginal edge of a transparent member, first and second strip means for covering said first and second resilient members respectively; said first and second resilient members each receiving one of said strip means for rigidly clamping said transparent member between said mounting means; the length of said mounting clips being substantially less than the length of said channel member.

5. The assembly of claim 4 wherein each of said resilient members have a U-shaped cross section; each of said strip members having a T-shaped cross section and being seated in the groove formed by said U-shaped resilient members.

6. A partition assembly for forming a railing partition comprising a mounting assembly for securing and positioning a panel member to a supporting surface, said mounting assembly including a first elongated channel member having a pair of arms extending in a first direction; first and second mounting clips each having a central portion and first and second flanges extending in opposite directions from said central portion; said central portion having a channel; said first and second mounting clips being mounted to clamp said channel member extending arms between said first flanges and the marginal edge of said panel member between said second flanges; said first mounting clip channel having a plurality of apertures positioned at spaced intervals along said channel; said second mounting clip channel having a plurality of apertures along said channel, each being in alignment with an associated aperture of said first mounting clip channel; fastening means cooperating with said associated apertures securing said first and second mounting clips to one another; a base plate; first and second elongated reinforcing rods positioned parallel to said first mounting member; said rods and said first mounting means being secured to one another and to said base plate.

7. The assembly of claim 6 further comprising a cover member positioned over the ends of said first and second mounting members opposite said first mentioned ends for providing a railing assembly having a pleasing appearance and for securing said mounting members to one another.

8. The assembly of claim 7 further comprising first and second resilient members positioned in said channel member for receiving therebetween the marginal edge of a transparent member; first and second strip means for covering said first and second resilient members respectively; said first and second resilient members each receiving one of said strip means for rigidly clamping said transparent member between said mounting means.

9. A partition assembly for use with panel members for forming a movable partition comprising a mounting assembly for positioning and securing panel members; said mounting means including a cover plate; a plurality of first and second mounting clips positioned at spaced intervals along the panel member, each having a central portion and first and second flanges extending in opposite directions from said central portion; said central portion having a channel; said first and second mounting clips clamping the marginal edge of a first panel member between the marginal edge of an adjacent panel member between said second flanges; said first and second mounting clip channels having cooperating apertures in alignment with one another; fastening means being received by said apertures for urging said mounting clips towards one another to clamp said adjacent panel members therebetween; the length of said cover plate being substantially equal to the length of the panel members to be supported; the length of said mounting members being substantially less than the length of said cover plate; said cover plate having a projection received by the channels of said clip member to completely conceal said clip member; spring retaining means mounted in said clip channels and receiving said projection to secure said cover plate to said clips.

10. A partition assembly for use with panel members for forming a movable partition comprising a mounting assembly for positioning and securing panel members upon a substantially flat supporting surface; said mounting means including an elongated channel member having a pair of arms extending substantially in a first direction; a mounting clip having a base portion adapted to be secured to said channel member and said supporting surface by suitable fastening means; a pair of arms extending from said base portion; each of said arms having a channel formed therein and running substantially parallel to said supporting surface; said clip channels having cooperating apertures in alignment with one another; fastening means associated with said cooperating apertures securing the arms of said clip to clamp the margin of a panel member therebetween; a cover plate having a substantially C-shaped projection along one face of said plate positioned near the lower edge thereof and receiving and frictionally engaging one of said channel member arms; the upper end of said cover plate being flanged; the arms of said channel member being slightly biased toward one another; the flanged portion of said cover plate abutting the surface of said panel member under the influence of said inwardly biased channel member arm.

11. The assembly of claim 10 wherein the edge of said flanged portion has an extension secured thereto; said extension being substantially more resilient than said plate to conform to irregularities along the surface of said panel member.

12. The assembly of claim 10 wherein the lower edge of said cover plate has an extension secured thereto, said extension being substantially more resilient than said cover plate to conform to irregularities along said supporting surface.

13. A partition assembly for use with panel members for forming a movable partition comprising a mounting assembly for positioning and securing panel members between two surfaces, said mounting assembly including an elongated channel member having a pair of arms extending in a first direction; a plurality of first and second mounting clips each having a central portion and first and second flanges extending in opposite directions from said central portion; said central portion having first and second channels; all of said first and second clips being mounted to clamp said channel member extending arms between said first flanges and the marginal edge of said panel member between said second flanges; said first and second clip channels having cooperating apertures in alignment with one another; suitable fastening means being received by said apertures urging said clips towards one another to clamp said panel member and said channel member therebetween; the length of said clip members being substantially less than the length of said channel member; said first and second clips defining a passageway; the region of said central portion between said first and second channels for enclosing conduits therein.

References Cited by the Examiner

UNITED STATES PATENTS

| | | | |
|---|---|---|---|
| 1,417,102 | 5/1922 | Nyman et al. | 52—312 |
| 2,186,458 | 1/1940 | Lehman | 52—213 |
| 2,730,209 | 1/1956 | Larsen | 52—242 |
| 2,765,057 | 10/1956 | Stiefvater | 52—731 |
| 2,808,136 | 10/1957 | Hammitt et al. | 52—241 |
| 2,837,153 | 6/1958 | Brown et al. | 52—63 |
| 2,949,983 | 8/1960 | Gartner | 52—238 |
| 3,013,642 | 12/1961 | Hammitt et al. | 52—220 |
| 3,056,233 | 10/1962 | McNulty | 52—278 |
| 3,075,253 | 1/1963 | Hammitt et al. | 52—127 |

FOREIGN PATENTS 1,221,507   1/1960   France.

FRANK L. ABBOTT, *Primary Examiner.*

HENRY C. SUTHERLAND, *Examiner.*

J. L. RIDGILL, *Assistant Examiner.*